United States Patent
Cho et al.

(10) Patent No.: US 7,663,871 B2
(45) Date of Patent: Feb. 16, 2010

(54) PORTABLE COMPUTER AND METHOD FOR MOUNTING A FLAT PANEL DISPLAY DEVICE MODULE

(75) Inventors: Young Woo Cho, Kyonggi-do (KR); Jong Hwan Kim, Kyonggi-do (KR); Dae Hee Park, Kyonggi-do (KR)

(73) Assignee: LG Display Co., Ltd., Seoul (KR)

( * ) Notice: Subject to any disclaimer, the term of this patent is extended or adjusted under 35 U.S.C. 154(b) by 31 days.

(21) Appl. No.: 11/320,800

(22) Filed: Dec. 30, 2005

(65) Prior Publication Data

US 2006/0171106 A1 Aug. 3, 2006

Related U.S. Application Data

(63) Continuation of application No. 10/153,730, filed on May 24, 2002, now Pat. No. 7,170,741, which is a continuation of application No. 09/437,222, filed on Nov. 10, 1999, now Pat. No. 6,411,501.

(30) Foreign Application Priority Data

Nov. 11, 1998 (KR) ................ 1998-48265

(51) Int. Cl.
*H05K 5/00* (2006.01)
*H05K 7/00* (2006.01)
(52) U.S. Cl. .................. 361/679.26; 361/679.21; 361/679.27
(58) Field of Classification Search ........... 361/681, 361/679.21, 679.26, 679.27; 348/749; 349/56–58
See application file for complete search history.

(56) References Cited

U.S. PATENT DOCUMENTS 4,111,533 A 9/1978 Nakamura et al.
4,165,607 A 8/1979 Fedorowicz et al.
4,329,800 A 5/1982 Shuman
4,422,728 A 12/1983 Andreaggi
4,614,406 A 9/1986 Motoi
4,755,035 A 7/1988 Kopish et al.
4,781,422 A 11/1988 Kimble (Continued)

FOREIGN PATENT DOCUMENTS

DE 41 20 950 11/1998

(Continued)

OTHER PUBLICATIONS

Sony 14.1 Notebook PC, 6 pp.

(Continued)

*Primary Examiner*—Jayprakash N Gandhi
*Assistant Examiner*—Anthony M Haughton
(74) *Attorney, Agent, or Firm*—McKenna Long & Aldridge LLP

(57) ABSTRACT

Disclosed is a computer that includes: a system body having an input device; a display module having a display surface and a rear surface; a display case having a side wall surface; and a hinge pivotally coupling the body to the display module, the hinge including a hinge frame having first and second surfaces, the first surface coupled with the rear surface of the display module, the second surface coupled with the side wall surface of the display case.

35 Claims, 14 Drawing Sheets

U.S. PATENT DOCUMENTS

| | | | |
|---|---|---|---|
| 4,796,977 A | 1/1989 | Drake | |
| 4,937,709 A | 6/1990 | Yanagi et al. | |
| 4,959,887 A | 10/1990 | Gruenberg et al. | |
| 5,001,468 A | 3/1991 | Brice et al. | |
| 5,002,368 A | 3/1991 | Anglin | |
| 5,041,965 A | 8/1991 | Chen | |
| 5,102,084 A | 4/1992 | Park | |
| 5,103,377 A | 4/1992 | Kobayashi et al. | |
| 5,119,204 A * | 6/1992 | Hashimoto et al. | 348/794 |
| D328,291 S | 7/1992 | Falkner | |
| 5,128,662 A | 7/1992 | Failla | |
| 5,168,426 A | 12/1992 | Hoving et al. | |
| 5,173,837 A | 12/1992 | Blackwell et al. | |
| 5,195,213 A | 3/1993 | Ohgami et al. | |
| 5,216,411 A | 6/1993 | Ashitomi et al. | |
| 5,229,920 A | 7/1993 | Spaniol et al. | |
| 5,233,502 A | 8/1993 | Beatty et al. | |
| 5,238,421 A | 8/1993 | Kobayashi | |
| 5,264,992 A | 11/1993 | Hogdahl et al. | |
| 5,268,816 A | 12/1993 | Abell, Jr. et al. | |
| 5,268,817 A | 12/1993 | Miyagawa et al. | |
| 5,272,601 A | 12/1993 | McKillip | |
| 5,276,589 A | 1/1994 | Bartlett et al. | |
| 5,313,318 A | 5/1994 | Gruenberg et al. | |
| 5,328,379 A | 7/1994 | Kobayashi | |
| 5,363,227 A | 11/1994 | Ichikawa et al. | |
| 5,363,276 A | 11/1994 | Crockett | |
| 5,375,005 A * | 12/1994 | Komano | 349/58 |
| 5,379,182 A * | 1/1995 | Fujimori et al. | 361/681 |
| D356,077 S | 3/1995 | Harada et al. | |
| 5,422,751 A | 6/1995 | Lewis et al. | |
| 5,423,605 A | 6/1995 | Liu | |
| 5,432,626 A | 7/1995 | Sasuga et al. | |
| 5,467,106 A | 11/1995 | Salomon | |
| 5,467,504 A | 11/1995 | Yang | |
| 5,479,285 A | 12/1995 | Burke | |
| 5,483,253 A | 1/1996 | Suganuma et al. | |
| 5,486,942 A | 1/1996 | Ichikawa et al. | |
| 5,494,447 A | 2/1996 | Zaidan | |
| 5,504,605 A | 4/1996 | Sakuma et al. | |
| 5,546,270 A | 8/1996 | Konno et al. | |
| 5,559,670 A | 9/1996 | Flint et al. | |
| 5,566,048 A | 10/1996 | Esterberg et al. | |
| 5,568,357 A | 10/1996 | Kochis et al. | |
| 5,570,267 A * | 10/1996 | Ma | 361/681 |
| 5,583,529 A | 12/1996 | Satou | |
| 5,619,351 A | 4/1997 | Funamoto et al. | |
| 5,634,351 A | 6/1997 | Larson et al. | |
| 5,636,101 A | 6/1997 | Bonsall et al. | |
| 5,636,102 A | 6/1997 | Fujino et al. | |
| 5,644,516 A | 7/1997 | Podwalny et al. | |
| 5,654,779 A * | 8/1997 | Nakayama et al. | 349/58 |
| 5,666,172 A * | 9/1997 | Ida et al. | 349/58 |
| 5,673,170 A | 9/1997 | Register | |
| 5,680,183 A | 10/1997 | Sasuga et al. | |
| 5,682,645 A | 11/1997 | Watabe et al. | |
| 5,689,400 A | 11/1997 | Ohgami et al. | |
| 5,717,566 A | 2/1998 | Tao | |
| 5,739,880 A * | 4/1998 | Suzuki et al. | 349/110 |
| 5,771,539 A | 6/1998 | Wahlstedt et al. | |
| 5,777,704 A | 7/1998 | Selker | |
| 5,805,117 A | 9/1998 | Mazurek et al. | |
| 5,805,125 A | 9/1998 | Suganuma et al. | |
| 5,815,225 A | 9/1998 | Nelson | |
| 5,825,613 A | 10/1998 | Holden | |
| 5,831,816 A | 11/1998 | Johns et al. | |
| 5,835,139 A | 11/1998 | Yun et al. | |
| 5,835,343 A | 11/1998 | Johns et al. | |
| 5,838,400 A * | 11/1998 | Ueda et al. | 349/58 |
| 5,838,421 A * | 11/1998 | Pedack | 351/218 |
| 5,844,772 A | 12/1998 | Lee et al. | |
| 5,844,774 A * | 12/1998 | Gushiken et al. | 361/681 |
| 5,872,006 A | 2/1999 | Kim | |
| 5,872,604 A | 2/1999 | Kim | |
| 5,872,606 A | 2/1999 | Kim | |
| 5,905,550 A | 5/1999 | Ohgami et al. | |
| 5,926,237 A | 7/1999 | Yun et al. | |
| 5,946,061 A * | 8/1999 | Kurihara et al. | 349/58 |
| 6,002,457 A | 12/1999 | Yun et al. | |
| 6,002,582 A | 12/1999 | Yeager et al. | |
| 6,020,942 A | 2/2000 | Yun et al. | |
| 6,064,565 A * | 5/2000 | Ishihara et al. | 361/681 |
| 6,068,227 A | 5/2000 | Morgan et al. | |
| 6,128,183 A * | 10/2000 | Uchiyama et al. | 361/681 |
| 6,144,423 A | 11/2000 | Kim | |
| 6,147,724 A * | 11/2000 | Yoshii et al. | 349/62 |
| 6,212,067 B1 * | 4/2001 | Nakajima et al. | 361/681 |
| 6,304,432 B1 | 10/2001 | Kim | |
| 6,330,148 B1 | 12/2001 | Won et al. | |
| 6,369,866 B1 * | 4/2002 | Rai et al. | 349/61 |
| 6,373,537 B2 | 4/2002 | Yun et al. | |
| 6,388,722 B1 * | 5/2002 | Yoshii et al. | 349/62 |
| 6,411,501 B1 | 6/2002 | Cho | |
| 6,421,231 B1 * | 7/2002 | Jung | 361/681 |
| 6,430,039 B2 * | 8/2002 | Nakajima et al. | 361/681 |
| 6,498,718 B1 | 12/2002 | Kim et al. | |
| 6,501,641 B1 | 12/2002 | Kim et al. | |
| 6,512,558 B2 | 1/2003 | Kim | |
| 6,525,790 B1 * | 2/2003 | Kan-o | 349/58 |
| 6,618,240 B1 | 9/2003 | Kim | |
| 6,693,794 B2 | 2/2004 | Kim | |
| 6,838,810 B1 | 1/2005 | Bovio et al. | |
| 6,989,986 B2 * | 1/2006 | Kumagai et al. | 361/681 |
| 6,992,884 B2 * | 1/2006 | Minaguchi et al. | 361/683 |
| 7,254,013 B2 * | 8/2007 | Tatsukami et al. | 361/681 |
| 2003/0189681 A1 | 10/2003 | Han et al. | |
| 2003/0234894 A1* | 12/2003 | Lee | 349/58 |
| 2004/0240165 A1* | 12/2004 | Minaguchi et al. | 361/683 |
| 2005/0151041 A1* | 7/2005 | Tatsukami et al. | 248/220.21 |

FOREIGN PATENT DOCUMENTS

| | | |
|---|---|---|
| EP | 317 261 | 5/1989 |
| EP | 1 052 536 A3 | 1/1991 |
| EP | 0 425 793 | 5/1991 |
| EP | 0 454 120 | 5/1991 |
| EP | 0 532 284 | 3/1993 |
| EP | 0 587 144 | 3/1993 |
| EP | 0 604 872 | 7/1994 |
| EP | 0 620 473 | 7/1994 |
| EP | 0 880 049 A1 | 2/2001 |
| GB | 2 223 875 | 4/1990 |
| GB | 2 305 689 | 4/1997 |
| GB | 2 305 690 | 4/1999 |
| JP | S52-045367 | 9/1977 |
| JP | S62-137479 | 2/1984 |
| JP | S62-269931 | 8/1987 |
| JP | H01-094983 | 11/1987 |
| JP | 64-017313 | 1/1989 |
| JP | H01-059223 | 4/1989 |
| JP | H01-211721 | 4/1989 |
| JP | H03-006670 | 4/1989 |
| JP | 01237591 | 9/1989 |
| JP | 02079893 | 3/1990 |
| JP | H02-083573 | 6/1990 |
| JP | H02-244190 | 9/1990 |
| JP | 03129986 | 6/1991 |
| JP | H03-156488 | 7/1991 |
| JP | H03-200282 | 9/1991 |
| JP | H04-020086 | 2/1992 |
| JP | H04-051595 | 2/1992 |
| JP | H04-056822 | 2/1992 |
| JP | H05-042853 | 2/1993 |
| JP | 5-80334 | 4/1993 |

| | | |
|---|---|---|
| JP | H05-080334 | 4/1993 |
| JP | 05-188810 | 7/1993 |
| JP | H05-050428 | 7/1993 |
| JP | H06-021018 | 3/1994 |
| JP | H03-221011 | 6/1994 |
| JP | 06-214511 A | 8/1994 |
| JP | H06-348364 | 12/1994 |
| JP | 07-020447 A | 1/1995 |
| JP | 07199180 | 8/1995 |
| JP | 07281184 | 10/1995 |
| JP | H07-261187 | 10/1995 |
| JP | H07-044577 | 11/1995 |
| JP | H07-044579 | 11/1995 |
| JP | 08211964 | 8/1996 |
| JP | H08-211964 | 8/1996 |
| JP | H09-026753 | 1/1997 |
| JP | S59-020273 | 4/1997 |
| JP | 9-171358 | 6/1997 |
| JP | H09-146466 | 6/1997 |
| JP | 09-190156 | 7/1997 |
| JP | 09190156 A * | 7/1997 |
| JP | H09-199875 | 7/1997 |
| JP | H09-297542 | 11/1997 |
| JP | H09-311319 | 12/1997 |
| JP | 10-117313 | 6/1998 |
| JP | H10-301095 | 11/1998 |
| KR | 1019980041727 | 8/1998 |
| KR | 2003-0080125 | 10/2003 |
| KR | 2003-0080126 | 10/2003 |
| WO | WO 90/10924 | 9/1990 |
| WO | WO 90/15359 | 12/1990 |
| WO | WO 96/27147 | 9/1996 |

OTHER PUBLICATIONS

IBM Monitor, Model #9516, 13 pp.
Pixel Vision SGT15P, 9 pp.
IBM Monitor, Model # 39H7116, 7 pp.
View Sonic Corporation Monitor, Model # VPA138, 6 pp.
View Sonic Corporation Monitor, Model # VP140, 5 pp.
Cockpit Displays III (SPIE—The International Society for Optical Engineering) vol. 2734, 12 pp.
IBM Electronic Pocket Reference Manual for the IBM 9516-A03 Monitor, 29 pp.
Natsuyama, *Structure Design for Liquid Crystal Display Module*, IBM Technical Disclosure Bulletin, Jan. 1996, pp. 71-74.
Suzuki et al., *High Efficiency Back Light for Lcd.*, IBM Technical Disclosure Bulletin, Feb. 1991, pp. 261-262.
Kimura et al., *Cell Support Assembly without Screw*, IBM Technical Disclosure Bulletin, Dec. 1994, pp. 33-34.
Murata et al., 10.4-inch TFT Liquid Crystal Display or Sub-Note Type Personal Computers, National Technical Report, Dec. 1997, vol. 43, Issue 6, pp. 56-61, w/English Abstract.
"Nikkei Microdevice Special Issue Flat Panel Display 1997", Dec. 12, 1996 at p. 49.
Appln for Mccartney, Richard, et al; the Primary Flight Instruments for the Boeing 777 Airplane; SPIE Vo. 2219 Cockpit Display; 1994; 13 pgs.
Appln for Smith-Gillespie, Robert D., et al; 777 LCD Backlight Life; SPIE Vo. 2219 Cockpit Display; 1994; 9 pgs.
Kawamoto, Masahiro, et al; Color-Liquid-Crystal Display for Automotive Instrument Panel (English Trnsltn included); 14 pgs.
Prosecution History of European Patent No. 0880049; 184 pgs.
Prosecution History of European Patent No. 297 12775; 53 pgs.
Prosecution History of European Patent No. 297 21 272.9; 45 pgs.
Prosecution History of European Patent No. 2 319 110; 124 pgs.
Prosecution History of European Patent No. 2 761 798; 22 pgs.
Prosecution History of European Patent No. 197 31 006; 44 pgs.
Prosecution History of European Patent No. 0 880 049; 53 pgs.
Prosecution History of European Patent No. 00115576; 32 pgs.
Prosecution History of Singapore Patent No. 9800814-7; 52 pgs.
English language translation dated Apr. 9, 1999 of attachment to Japanese Patent Appln. H09-135610, (17 pgs.).

* cited by examiner

PORTABLE COMPUTER AND METHOD FOR MOUNTING A FLAT PANEL DISPLAY DEVICE MODULE

This application is a continuation of application Ser. No. 10/153,730 filed on May 24, 2002 now U.S. Pat. No. 7,170,741, which is a continuation of application Ser. No. 09/437,222 filed Nov. 10, 1999, now U.S. Pat. No. 6,411,501.

This application claims the benefit of Korean Patent Application No. 1998-48265, filed on Nov. 11, 1998, which is hereby incorporated by reference for all purposes as if fully set forth herein.

BACKGROUND OF THE INVENTION

1. Field of the Invention

The present invention relates generally to a flat panel display device, and more particularly, to a flat panel display device mounting structure on a computer.

2. Description of the Related Art

Flat panel display devices include liquid crystal display (LCD) devices which are used widely, plasma display panels (PDP), and field emission displays (FED) which have been studied recently and may be applied to computers in the near future.

For convenience of explanation, the present invention will be discussed with respect to the LCD as an example of a flat screen type display device and a portable computer mounted with the LCD.

Referring to FIG. 1, a general portable computer such as a laptop or notebook computer typically includes a body 100, a flat panel display device assembly 110 coupled to the body 100 via a hinge mechanism 124. The flat panel display device assembly 110 has a flat panel display module 111 and a display case 122 supporting the module 111. The body 100 has an input device 102 such as a keyboard. As a flat panel display module 111, the LCD is widely used in portable computers and flat screen monitors.

Referring to FIG. 2 which shows a conventional assembly structure of the LCD device applied to a conventional portable computer, the display case 122 has a rear case 123 and a front case or frame 121 for mounting the LCD module 130. The rear case 123 has an outer surface and an inner surface and connecting ribs 123a formed at the corners.

The LCD module 130 has an LCD panel 132, a back light device 134 fixed to the back of the LCD panel 132, and a metal sash or supporting frame 136 for assembling the panel 132 and the back light device 134 along the edge.

At the corners of the metal sash 136, corresponding to the positions of the ribs 123a of the rear case 123, a plurality of protrusions 136a having holes are formed.

For mounting the LCD module 130 to the case 122, the LCD module 130 is placed on the rear case 123 and the holes of the metal sash 136 and the ribs 123a are fastened together preferably by screws 138. The front case 121 is coupled to the rear case 123.

Hereinafter, the way in which the LCD module is mounted to the case from the front toward the rear direction is defined as the front mounting method, and the assembled structure of the LCD module and the case made through the front mounting method is defined as the front mounting structure.

In the front mounting structure of the LCD module 130, since the protrusions 136a require additional space corresponding to the protruded width "d", the ratio of the display area of the LCD module 130 to the fixed size of the case 122 is reduced.

The front mounting structure may also include an additional feature to further support the LCD panel, as shown in FIGS. 3A and 3B.

Referring to FIGS. 3A and 3B, a conventional LCD device assembly 110 includes an LCD panel 112, a back light device (not shown) for the LCD panel 112, and a display case 122 supporting an LCD module 111. The LCD panel 112 and the back light device are assembled by a metal sash 114 along the edges together with a plastic mold frame (not shown) supporting the back light device.

The display case 122 is coupled to a body 120 via a hinge mechanism 124, which may extend from the body 120. The display case 122 and the hinge mechanism 124 allow the LCD device assembly 110 to pivotally move with respect to the body 120.

Two opposite sides of the metal sash 114 include flanges 114a for assembling the LCD module 111 to the display case 122, and flanges 114b for assembling the LCD module 111 to the hinge frame or hinge arm 126. Hereinafter, the former is referred as a fixing flange and the latter is referred as a mounting flange in this specification for distinction purposes. As shown in FIG. 3B, the fixing flanges 114a have a protruding width d2 and the mounting flanges 114b have a protruding width d1. A screw hole is formed in each of the flanges 114a and 114b. On the inner or bottom interior surface of the display case 122, ribs 122a are formed corresponding to the holes of the fixing flange 114a.

To mount the LCD module 111, the hinge frame 126 and the mounting flanges 114b of the metal sash 114 are screwed together, and the fixing flanges 114a of the metal sash 114 and the ribs 122a are screwed together by bolts 128.

In the mounting structure shown in FIG. 3B, the metal sash or support frame 114 requires side spaces for the flanges 114a and 114b. Therefore, the side space D (d1+d2) results in a reduction of the ratio of the display area of the LCD panel 112 relative to the display case 122. Moreover, as the display panel size increases, the display case 122 becomes undesirably large, especially for a portable computer such as a laptop computer.

To solve the above problem, an assembling structure has been suggested, as shown in FIG. 4, which is a partial perspective view. The hinge arm or frame 126, the case 122 and the side wall portion of the display module 110 are screwed together by bolts 128. However, although the embodiment shown in FIG. 4 is a good solution, there may be some instances where it is desired to attach the hinge arm, the case and the side wall portion of the display module without using a screw hole in the side wall portion of the display module or to attach the hinge arm with the case (FIG. 3A).

SUMMARY OF THE INVENTION

Accordingly, the present invention is directed to a portable computer that substantially obviates one or more of the problems due to limitations and disadvantages of the related art.

An object of the present invention is to minimize the non-display area of the LCD device.

Another object of the present invention is to provide a computer having a flat panel display device with a maximum display area and a minimal display case size.

A further object of the present invention is to provide a firm mounting structure for a flat panel display device on a computer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and the in accordance with the purpose of the present invention, as embodied and broadly described, the present invention provides, in one aspect, a computer including: a system body having an input device; a display module having a display surface and a rear surface; a display case having a side wall surface; and a hinge pivotally coupling the body to the display module, the hinge including a hinge frame having first and second surfaces, the first surface coupled with the rear surface of the display module, the second surface coupled with the side wall surface of the display case.

In another aspect, the present invention provides a portable computer including: a system body; a display module having a display surface and a side wall surface; a display case having an inner surface; and a hinge pivotally coupling the body to the display case, the hinge including a hinge frame having first and second surfaces, the first surface coupled with the inner surface of the display case, the second surface coupled with the side wall surface of the display module.

In another aspect, the present invention provides a computer including: a system body; a display module having a display surface; a display case having side walls, the display module secured between the side walls of the display case; and a hinge pivotally coupling the body to the display case, the hinge including a hinge frame coupled to the inner surface of the display case.

The present invention according to a first embodiment provides a method for mounting a display module in a portable computer including a system body, a display case having a side wall surface, a hinge having a hinge frame having first and second surfaces, the first surface being substantially parallel to a rear surface of the display module, the second surface being substantially parallel to the side wall surface of the display case, the hinge pivotally coupling the system body to the display case, the method comprising: arranging the hinge frame so that the first surface thereof is positioned between the display case and the rear surface of the display module, and so that the second surface thereof is positioned between the display module and the side wall surface of the display case; fastening the first surface of the hinge frame to the rear surface of the display module; and fastening the second surface of the hinge frame to the side wall surface of the display case.

The present invention according to a second embodiment provides a method for mounting a display module having a side wall surface in a portable computer including a system body, a display case having inner and side wall surfaces, a hinge having a hinge frame having first and second surfaces, the first surface being substantially parallel to a rear surface of the display module, the second surface being substantially parallel to the side wall surface of the display case, the hinge pivotally coupling the system body to the display case, the method comprising: arranging the hinge frame so that the first surface thereof is positioned between the display case and the rear surface of the display module, and so that the second surface thereof is positioned between the display module and the side wall surface of the display case; fastening the first surface of the hinge frame to the inner surface of the display case; and fastening the second surface of the hinge frame to the side wall surface of the display module.

The present invention according to a second embodiment also provides a method for mounting a display module having a side wall surface in a portable computer including a system body, a display case having an inner and two side wall surfaces, a hinge having a hinge frame, the hinge pivotally coupling the system body to the display case, the method comprising: arranging the hinge frame so that a surface thereof is positioned between the inner surface of the display case and the rear surface of the display module; fastening the surface of the hinge frame to the inner surface of the display case; and securing the display module between the side walls of the display case.

Preferably, the display module is a liquid crystal display device (LCD) module.

Preferably, the first and second surfaces of the hinge frame are substantially perpendicular to each other.

Preferably, the first surface of the hinge frame has at least one fixing protrusion protruded toward the rear surface of the display module, and the rear surface of the display module has at least one fixing hole corresponding to the fixing protrusion of the first surface.

Preferably, the fixing protrusion is a fastener.

Preferably, the second surface of the hinge frame is screw-coupled with the side wall surface of the display case.

Preferably, the hinge frame further has a third surface for supporting an edge of the display surface of the display module, and the third surface is substantially perpendicular to the second surface.

Preferably, the fixing protrusion is a fastener.

It is to be understood that both the foregoing general description and the following detailed description are exemplary and are intended to provide further explanation of the invention as claimed.

BRIEF DESCRIPTION OF THE DRAWINGS

The accompanying drawings, which are included to provide a further understand of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Reference will now be made in detail to the preferred embodiments of the present invention, an example of which is illustrated in the accompanying drawings.

Figure 1:
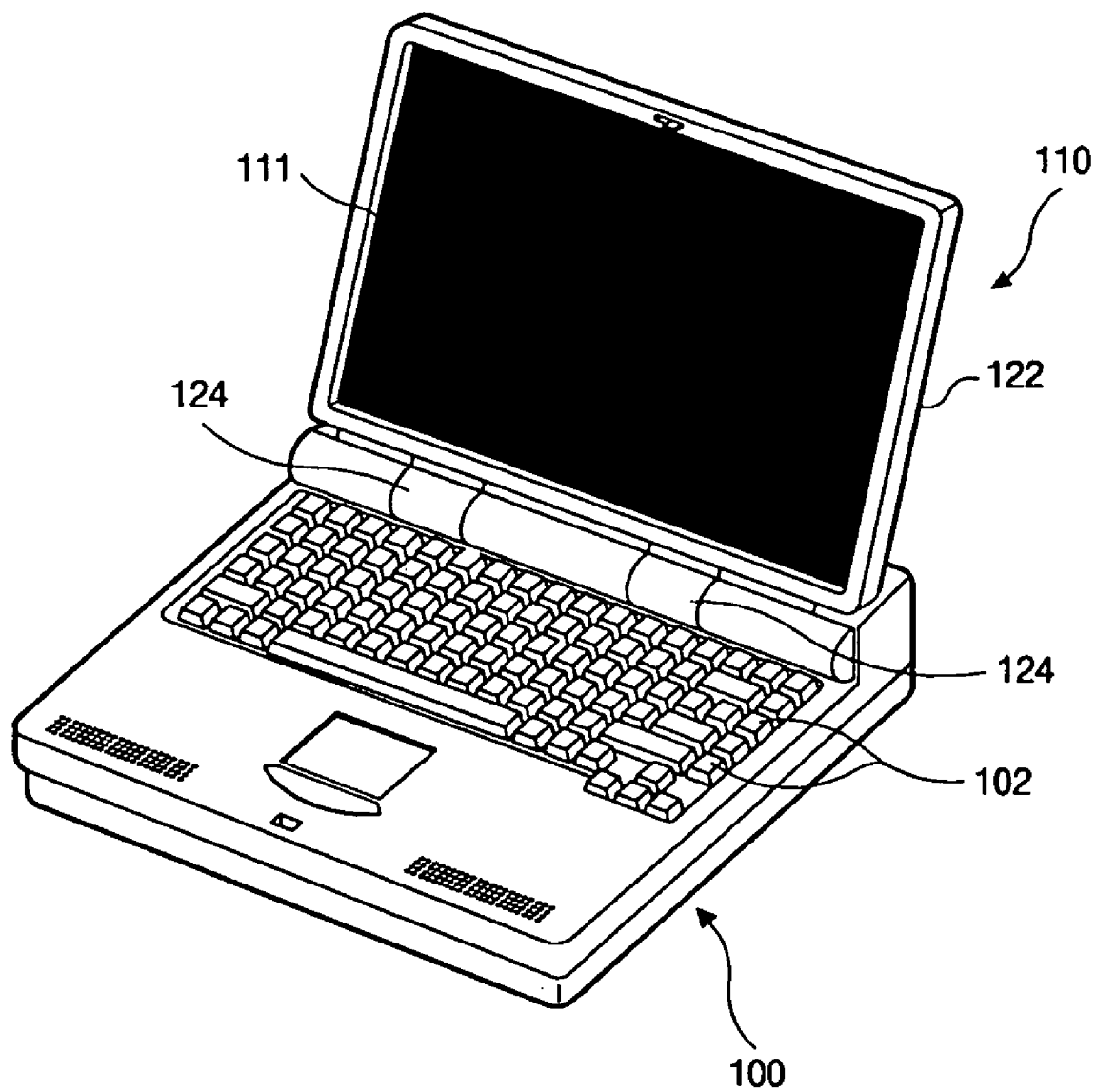
FIG. 1 is a perspective view showing a general portable computer.
Figure 2:
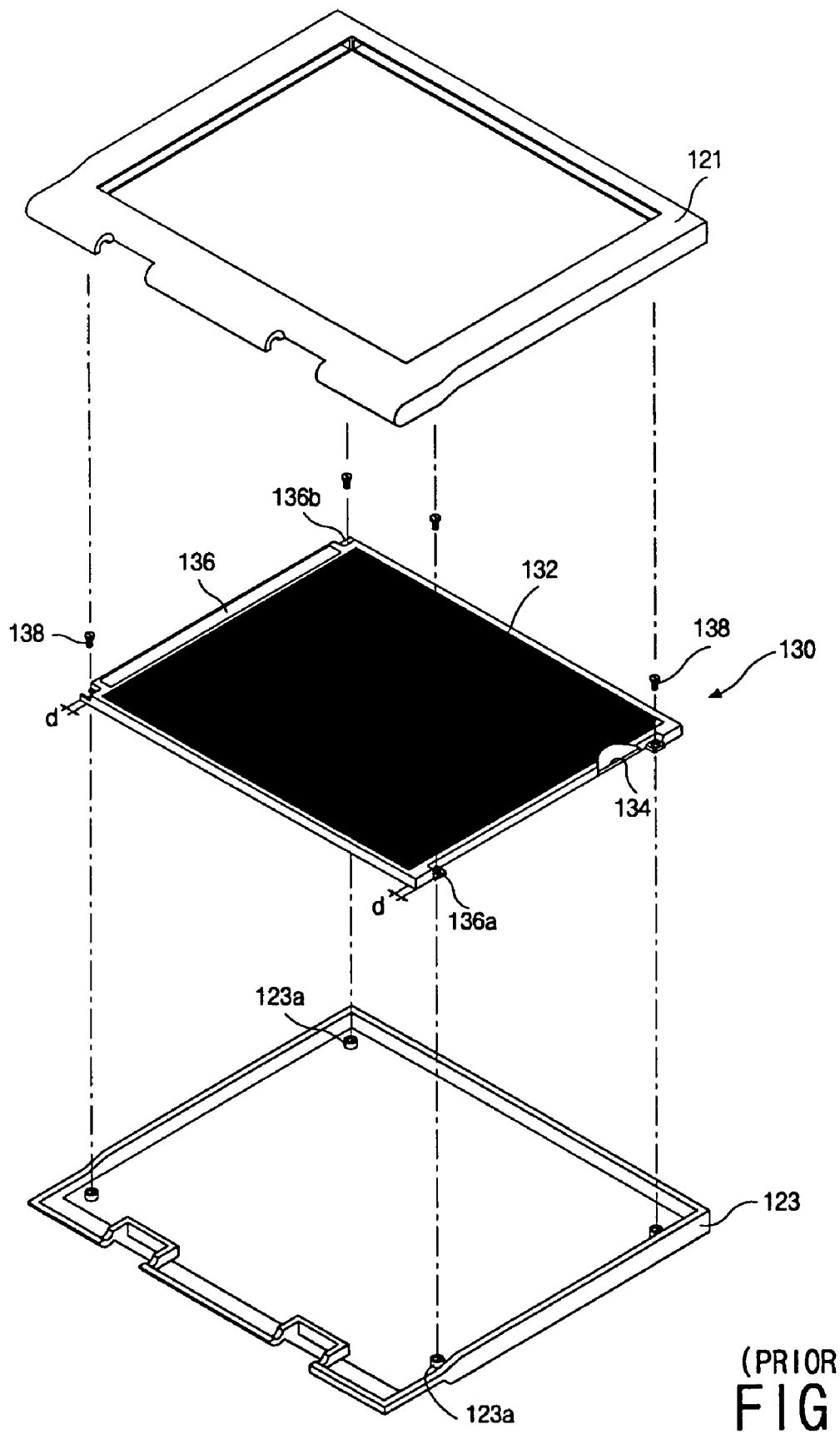
FIG. 2 shows a structure for mounting an LCD device for a portable computer.
Figure 3A:
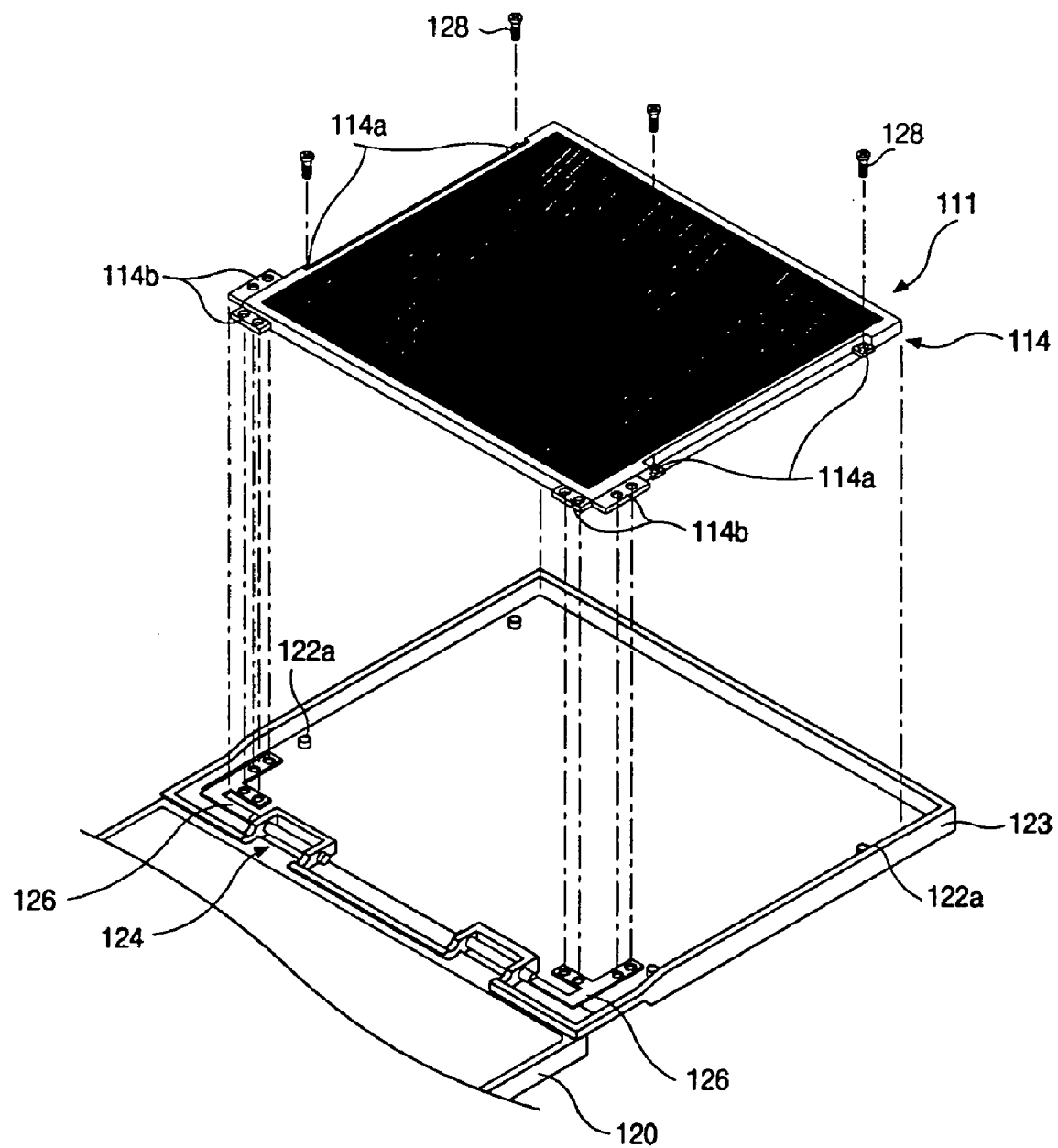
FIGS. 3A and 3B are a perspective view and a front view, respectively, showing a structure for mounting an LCD device for a portable computer.
Figure 3B:
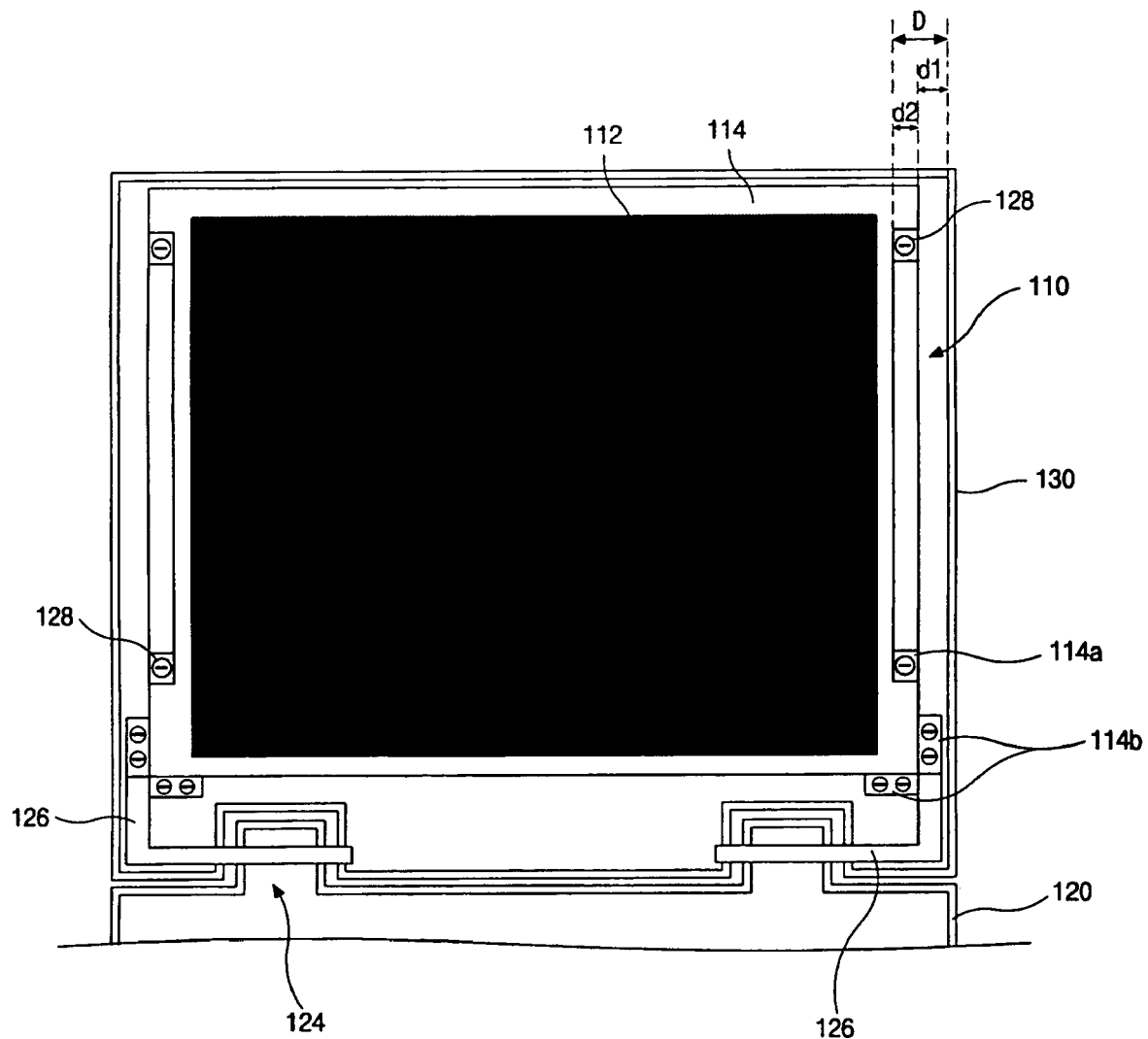
Figure 4:
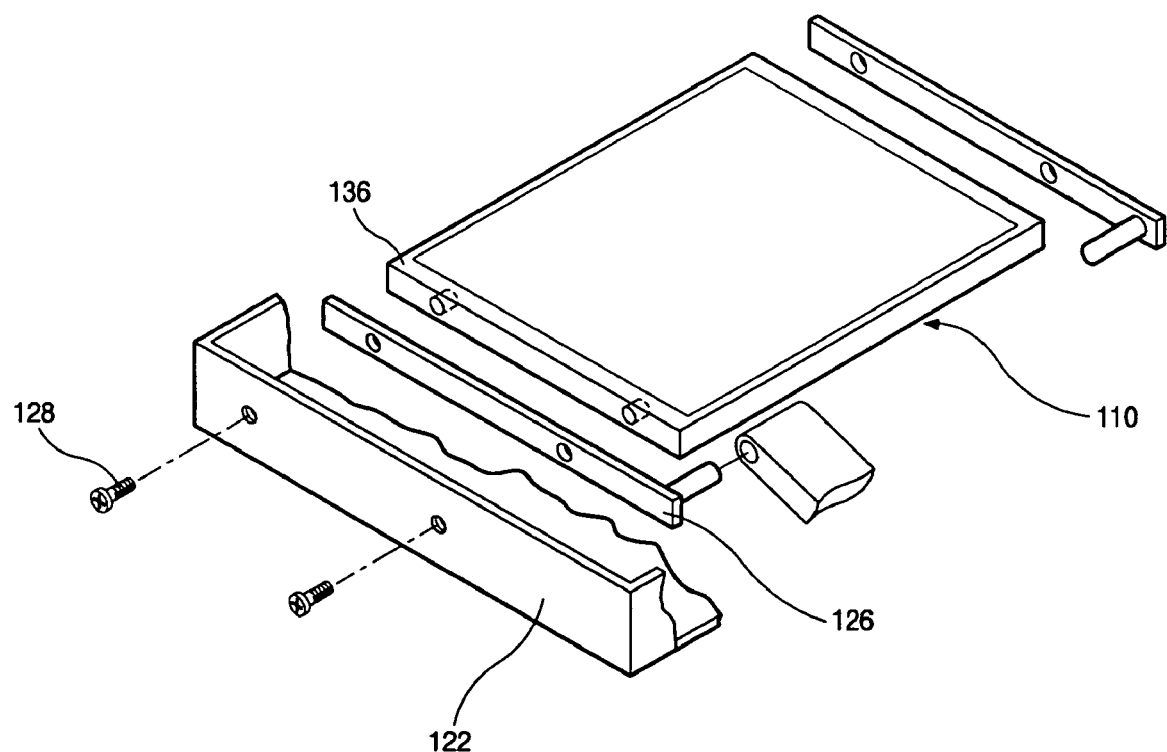
FIG. 4 is a partial view showing another mounting structure of the LCD device for a conventional portable computer.
Figure 5:
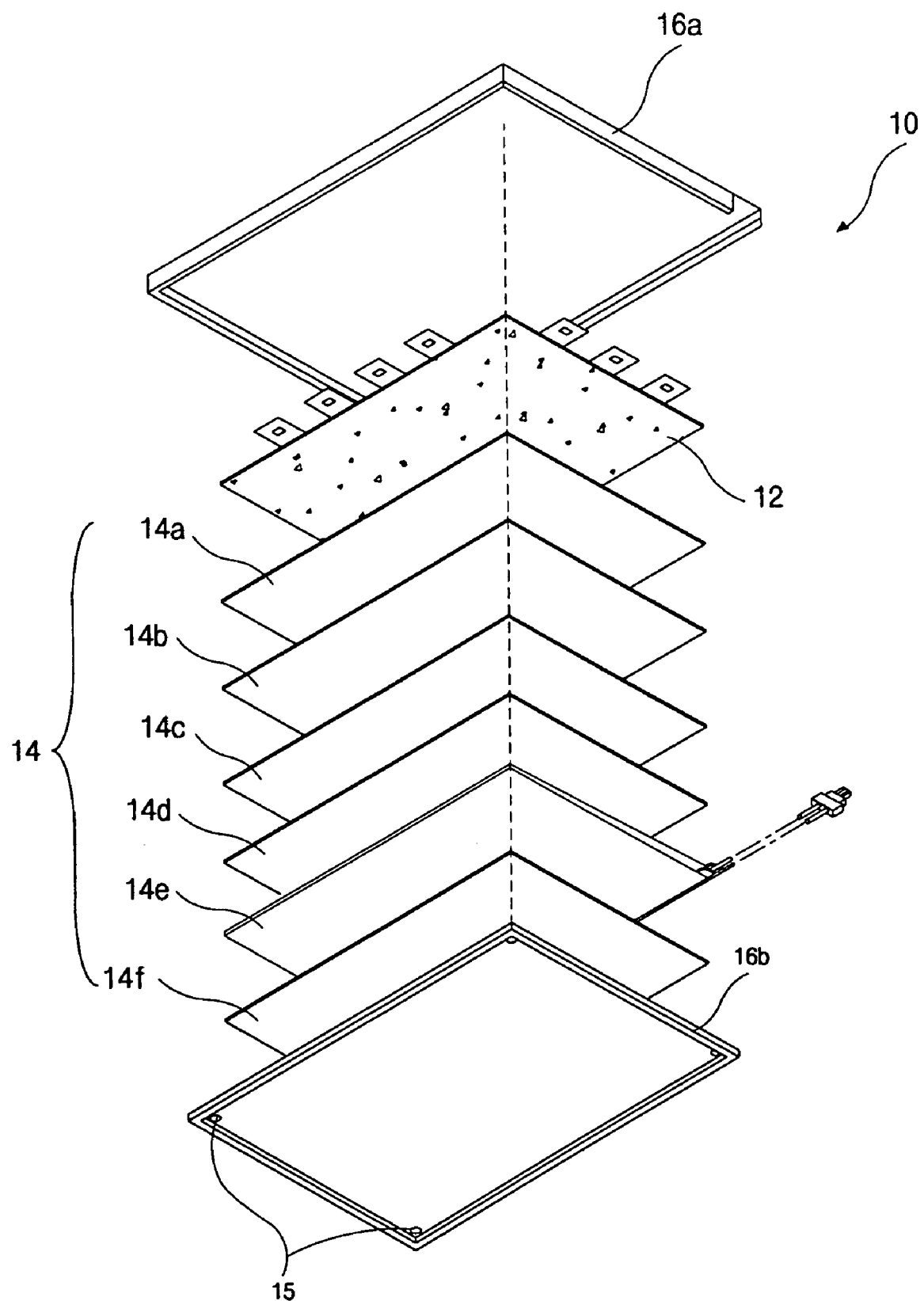
FIG. 5 is an exploded perspective view illustrating a structure for mounting a liquid crystal display module of a portable computer according to a first embodiment of the present invention.
Figure 6:
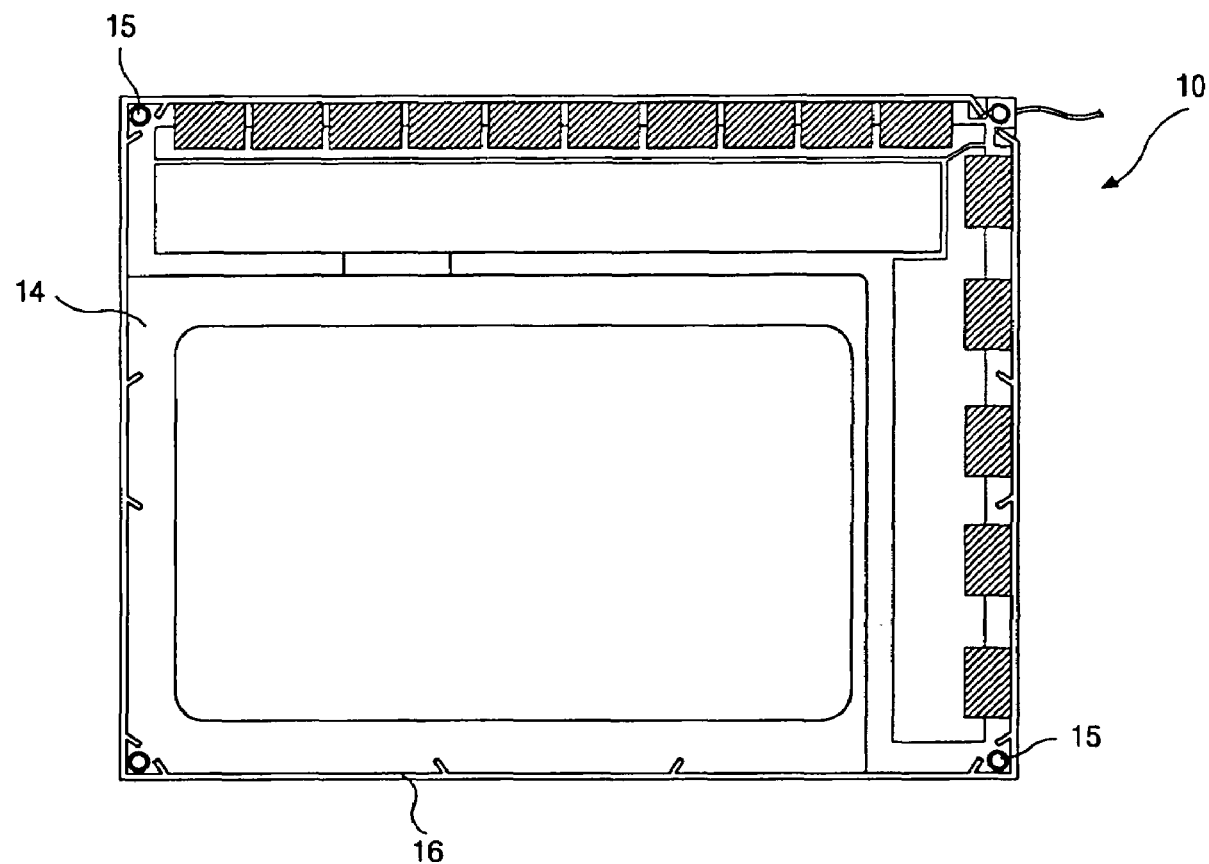
FIG. 6 is a bottom view illustrating a rear surface of a liquid crystal display module of a portable computer according to the first embodiment of the present invention.

Referring FIGS. 5 and 6, which show a first embodiment, a display module 10 (which may be a liquid crystal display module) has a display panel 12 and a back light device 14, both of which are assembled to each other by first and second frames 16a and 16b. The back light device 14 comprises a reflective plate 14a, a wave guide plate 14b, a first diffuser/protecting sheet 14c, a first prism sheet 14d, a second prism sheet 14e, and a second diffuser/protecting sheet 14f, which are layered in this order. The display panel 12 and the back light device 14 are supported by first and second frames 16a and 16b, and the second frame 16b has a fixing hole 15. As shown in FIG. 5, a plurality of fixing holes 15 are preferably arranged at each corner of the display module 10. The fixing holes 15 may have the shape of a rib, if necessary.

Figure 7:
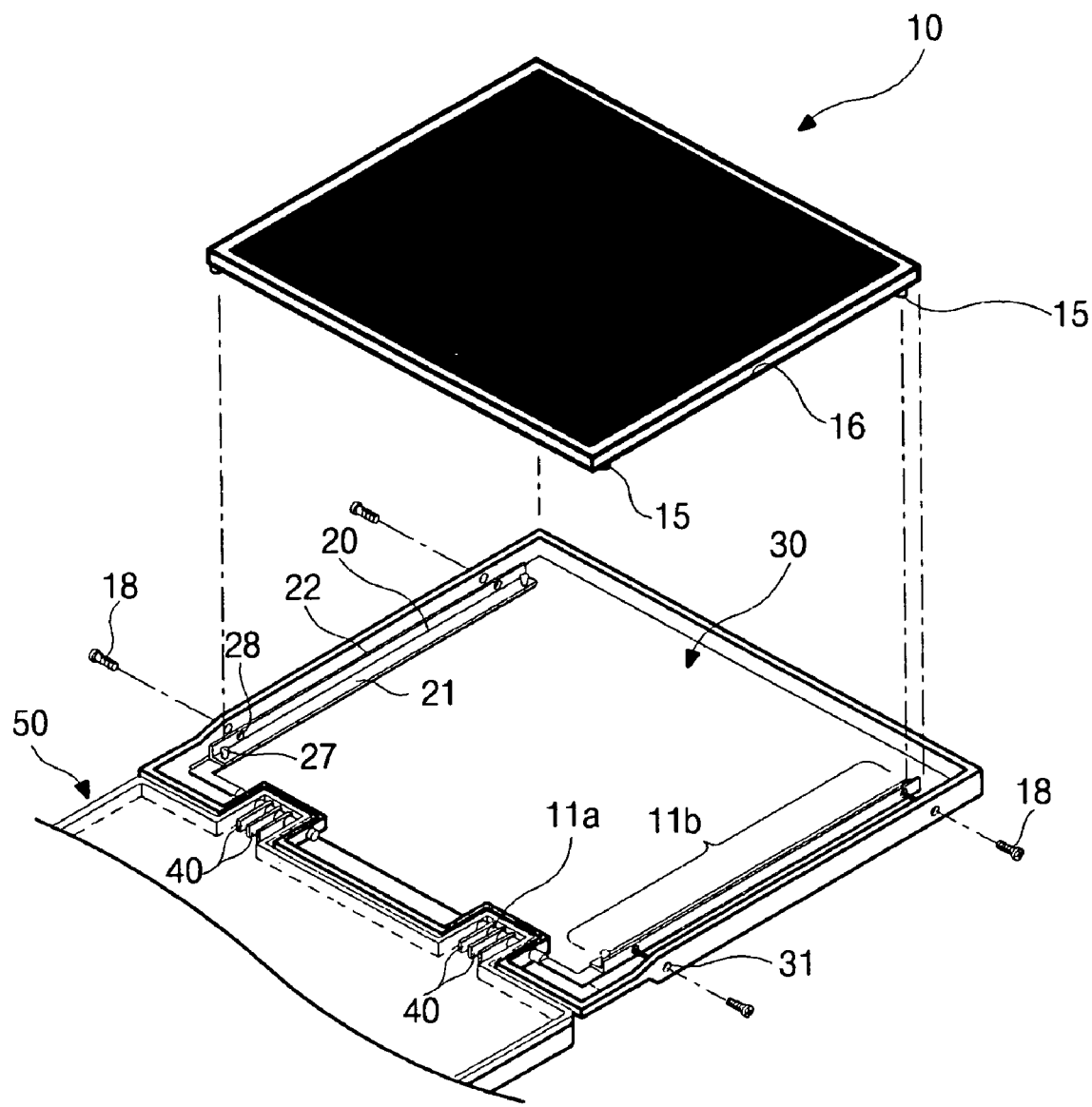
FIG. 7 is a partially exploded perspective view illustrating a structure for mounting a liquid crystal display module of a portable computer according to a first embodiment of the present invention.

FIG. 7 is a partially exploded perspective view illustrating structure for mounting a liquid crystal display module of a portable computer according to a first embodiment of the present invention.

A hinge mount 40 is positioned at a protruded portion of a system body 50 such that a display assembly having the display module 10 and the display case 30 pivotally moves with respect to the body 50. A third frame 20, such as a rear or hinge frame, is positioned on an inner, or bottom interior, surface of the display case 30. The hinge frame 20 is comprised of a pin portion 11a at its one end, which is inserted into the hinge mount 40, and a "L"-shaped portion 11b which has first and second surfaces 21 and 22. The first surface 21 is parallel to a rear surface of the display module 10, and the second surface 22 is parallel to a side wall surface of the display module 10. The pin portion 11a can be coupled to the L-shaped portion 11b or be integrally formed with the L-shaped portion 11b. The hinge or rear frame 20 also extends along the side wall surface of the display module 10. The first surface 21 has at least one fixing protrusion 27 corresponding to the fixing holes 15 of the rear surface of the display module 10, and the second surface 22 has at least one hole 28 corresponding to the through holes 31 of the side wall surface of the display case 30.

A preferred method for mounting the display module 10 according to the first embodiment is explained hereinafter. The fixing protrusion 27, which may be referred to as a fastener, fastening part or the like, of the second surface 22 of the L-shaped portion 11b of the hinge frame 20 is inserted into the fixing holes 15 of the display module 10 such that the display module 10 is secured. Then a coupling member 18, which may be a fastener or a fastening part, such as a screw and a nail passes through the hole 28 of the second surface 22 and the through holes 31 of the display case 30 such that the hinge frame 20 is fixed to the display case 30.

Also, the fixing protrusion 27 preferably has the shape of a plastic hook or a fastener for firmly holding the display module 10, and an inlet portion of the fixing hole 15 is preferably narrower than an interior portion of the fixing hole 15.

Figure 8:
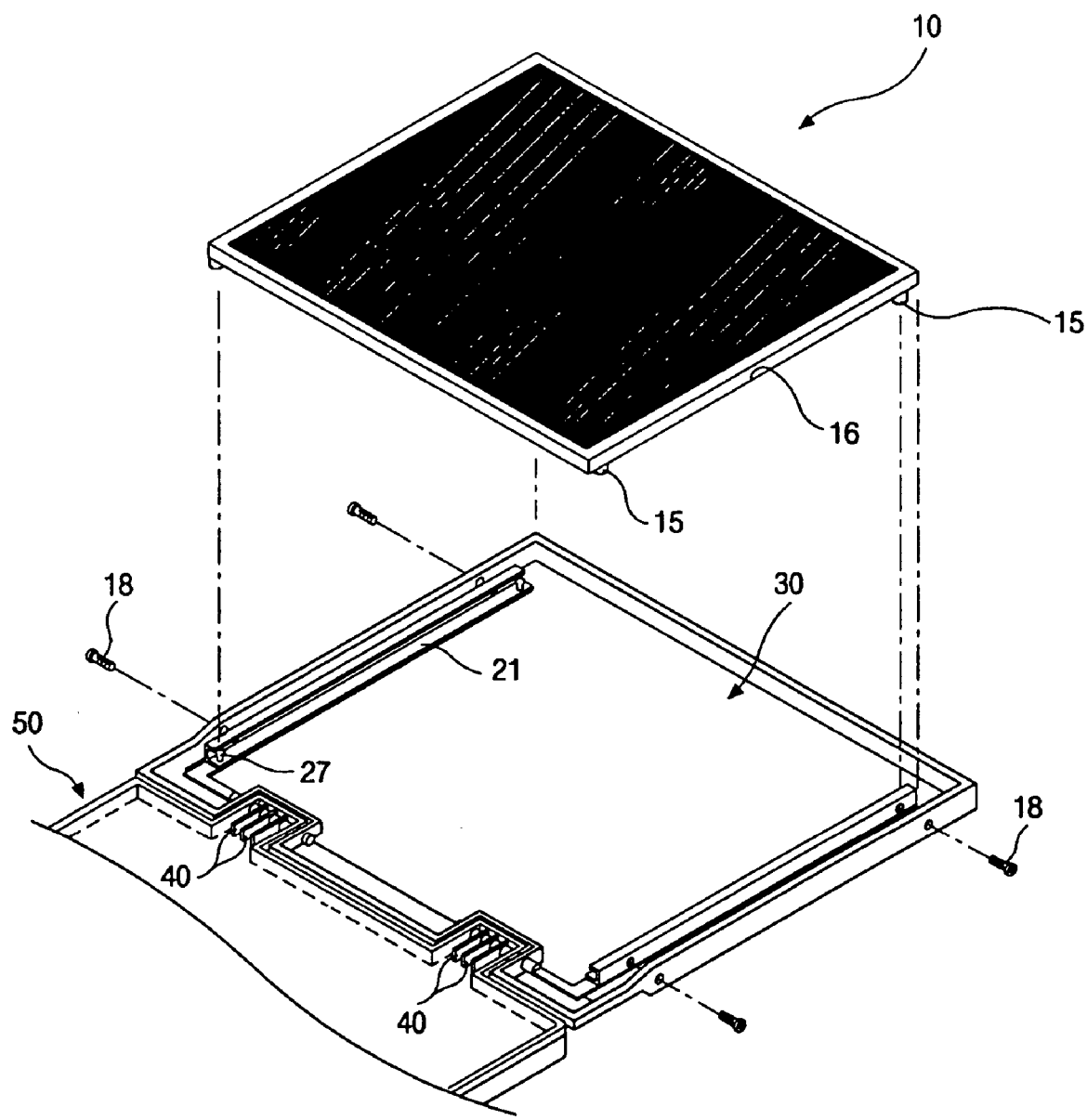
FIG. 8 is a partially exploded perspective view illustrating a modification of a structure for mounting a liquid crystal display module of a portable computer according to a first embodiment of the present invention.

To provide a more shockproof and shake-proof mounting structure, the hinge frame 20 can have the shape of "C" as shown in FIG. 8. That is, the hinge frame 20 further has a third surface 23 to support both upper edges of opposing sides of the display module 10 parallel to the hinge frame 20. The first and third surfaces 21 and 23 can be integrally formed with the second surface 22, or can be attachable brackets.

Figure 9:
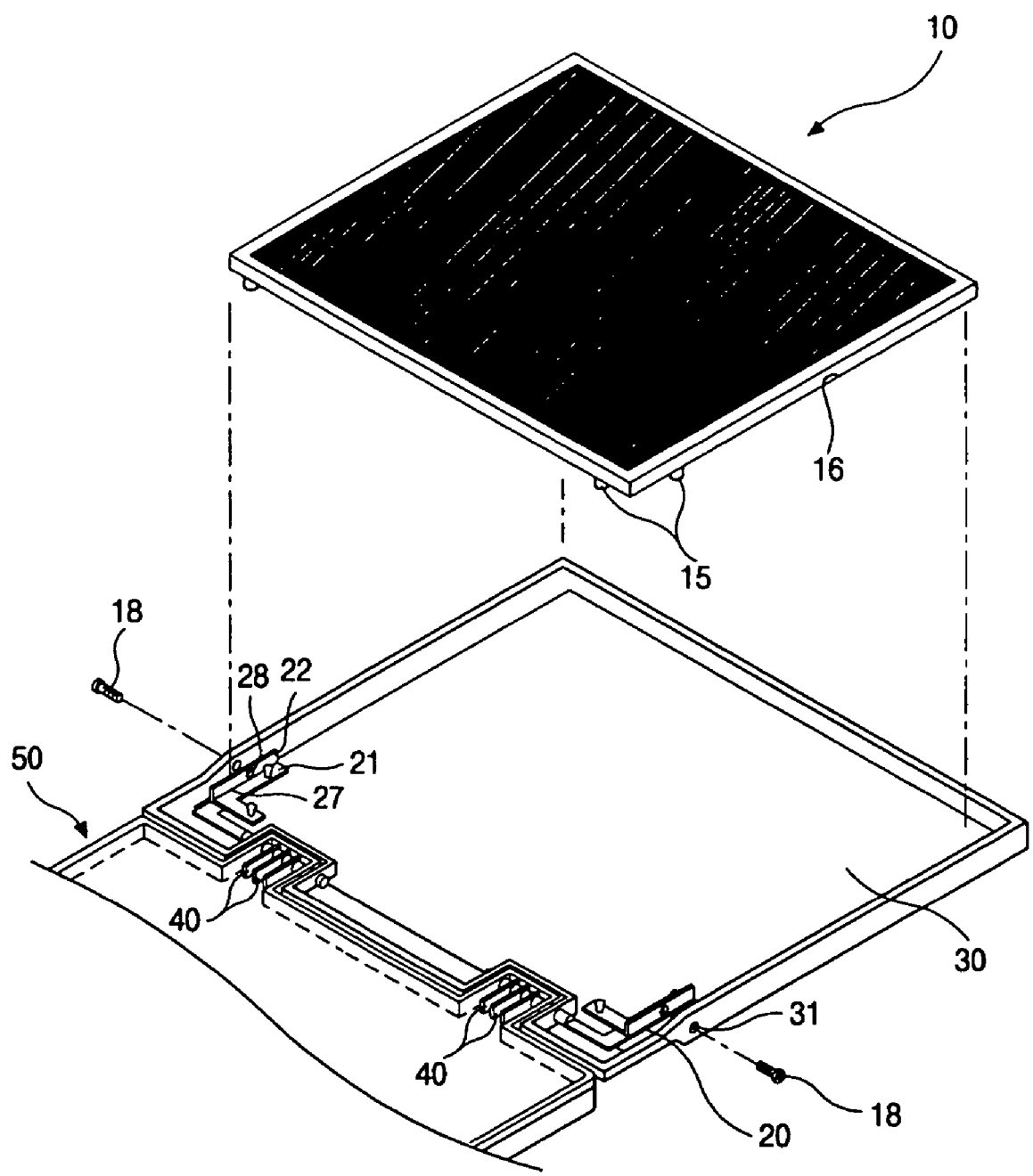
FIG. 9 is a partially exploded perspective view illustrating another modification of a structure for mounting a liquid crystal display module of a portable computer according to a first embodiment of the present invention.

FIG. 9 shows another modification of the first embodiment. The hinge frame 20 can have a reverse "F" shaped first surface 21 to hold the display module 10, instead of a long elongated first surface 21 (see FIG. 7).

Figure 10A:
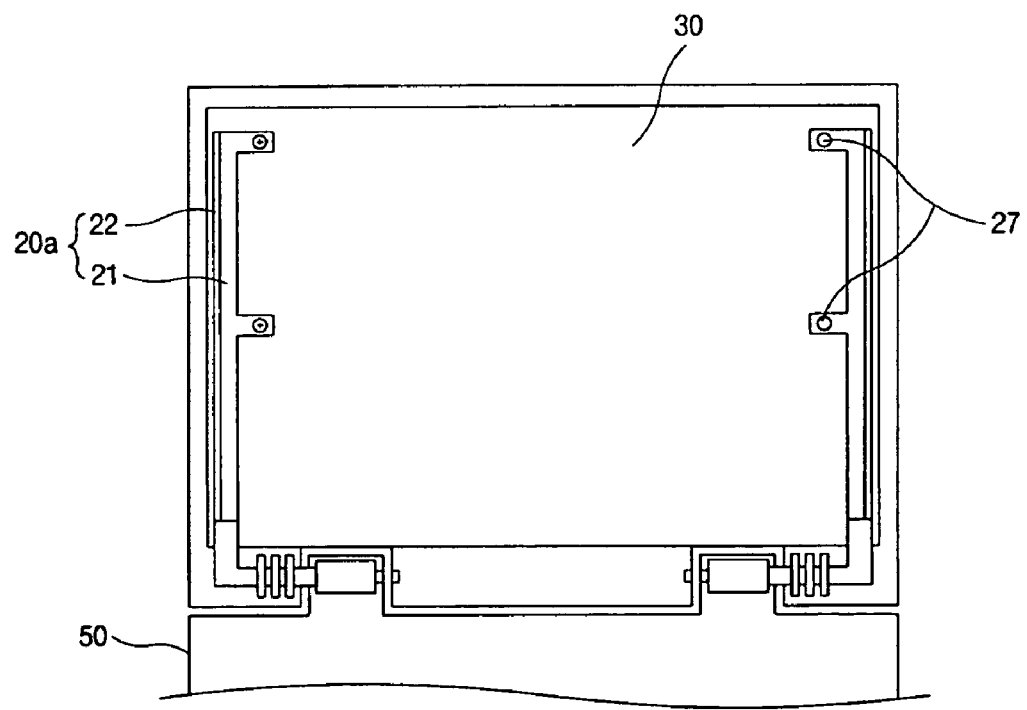
FIGS. 10A, 10B and 10C are partially exploded perspective views illustrating various modifications of a structure for mounting a liquid crystal display module of a portable computer according to a first embodiment of the present invention
Figure 10B:
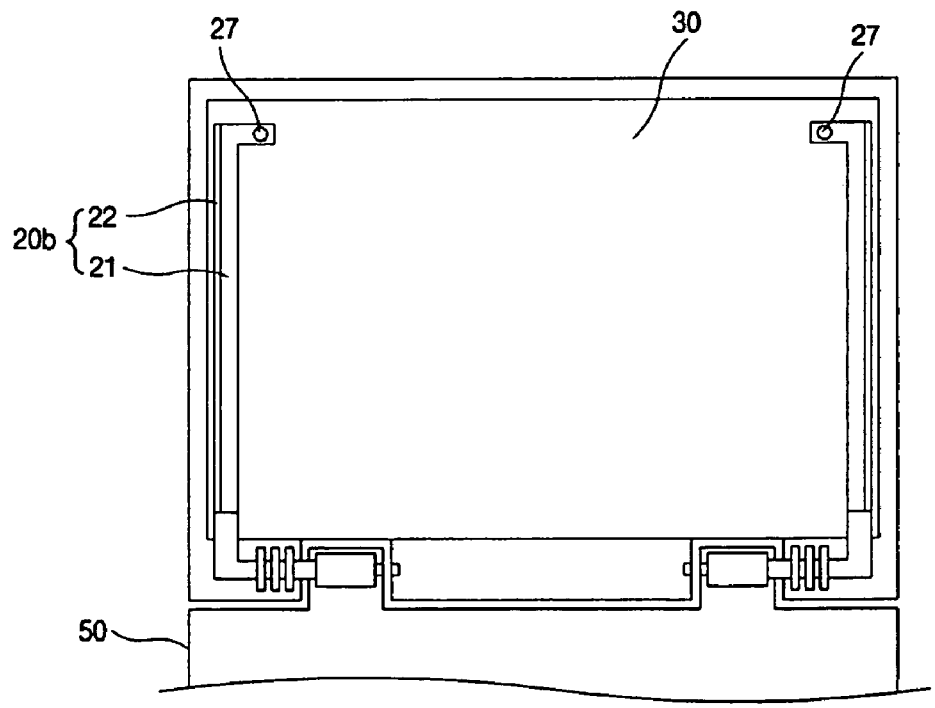
Figure 10C:
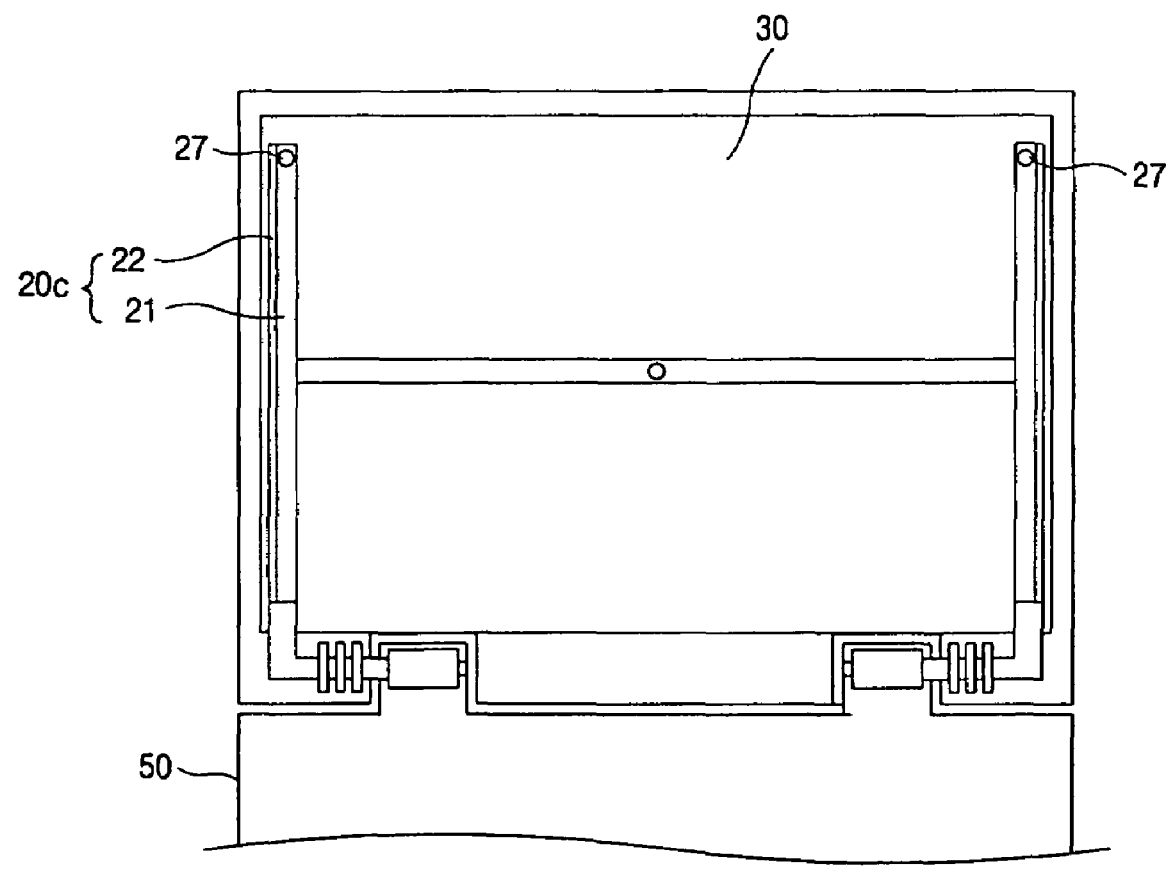

FIGS. 10A, 10B and 10C are other modifications of a mounting structure according to the first embodiment.

The hinge frames 20a, 20b and 20c may have various shapes of first surfaces 21 to enhance a fixing force of a display module 10.

Figure 11:
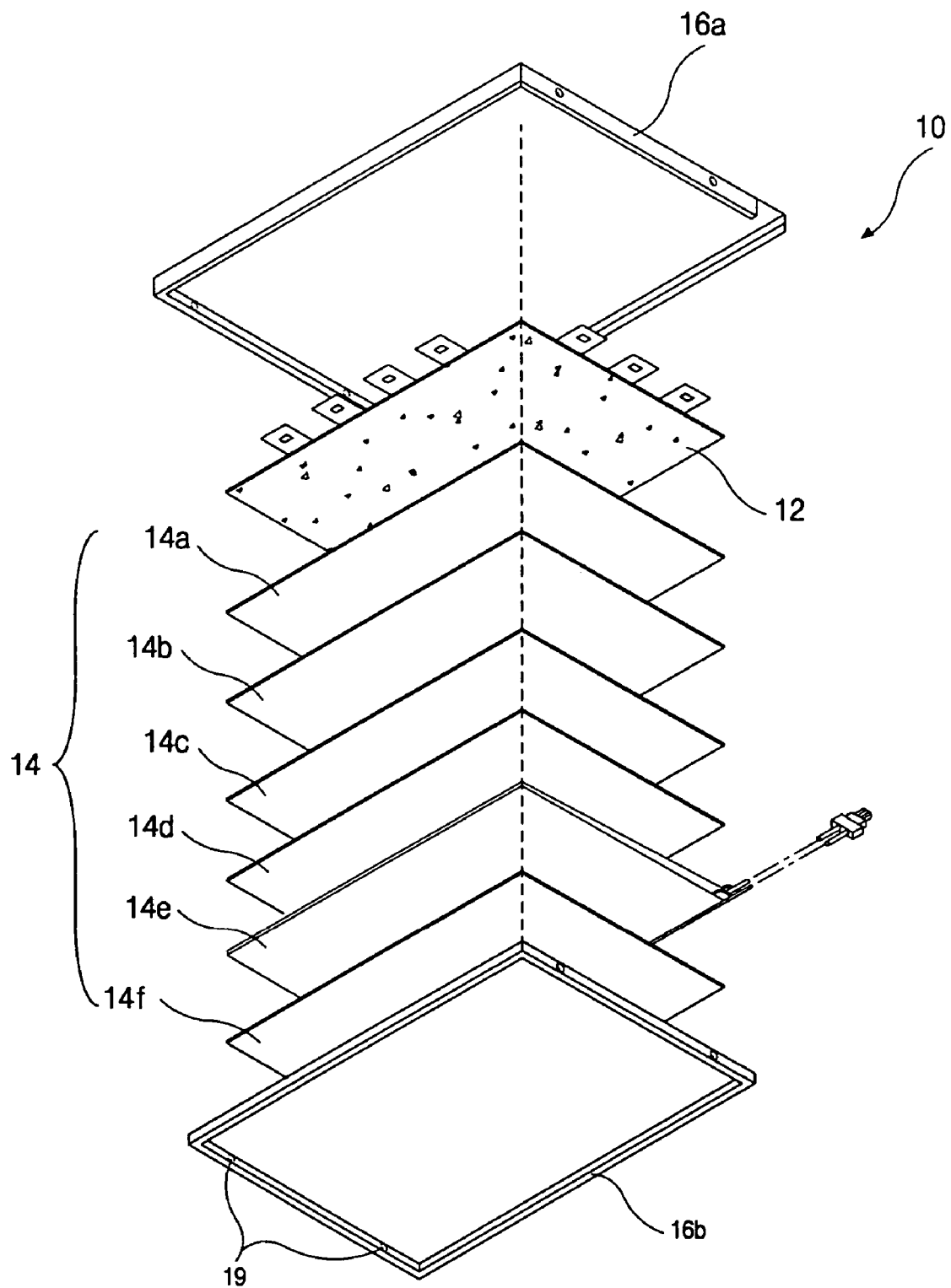
FIG. 11 is an exploded perspective view illustrating a liquid crystal display module according to a second embodiment according to the invention.

FIG. 11 illustrates a second embodiment, wherein the structure of the display module 10 is similar to that shown in FIG. 5, and therefore, the explanation thereof is not repeated here. However, the display module 10 has a plurality of fixing holes 19 on the side wall surface thereof other than the rear surface thereof. The fixing holes 19 are for a side mounting method wherein the side wall of the display module 10 is coupled to a hinge frame or to the case. That is, the display module 10 can be assembled to the third frame 20, such as a rear or hinge frame (see FIG. 7), not to the case 30 (see FIG. 7). It is also possible that the display module 10 is assembled to the case 30 directly, without engaging the third, such as rear or hinge frame 20, therebetween.

Figure 12:
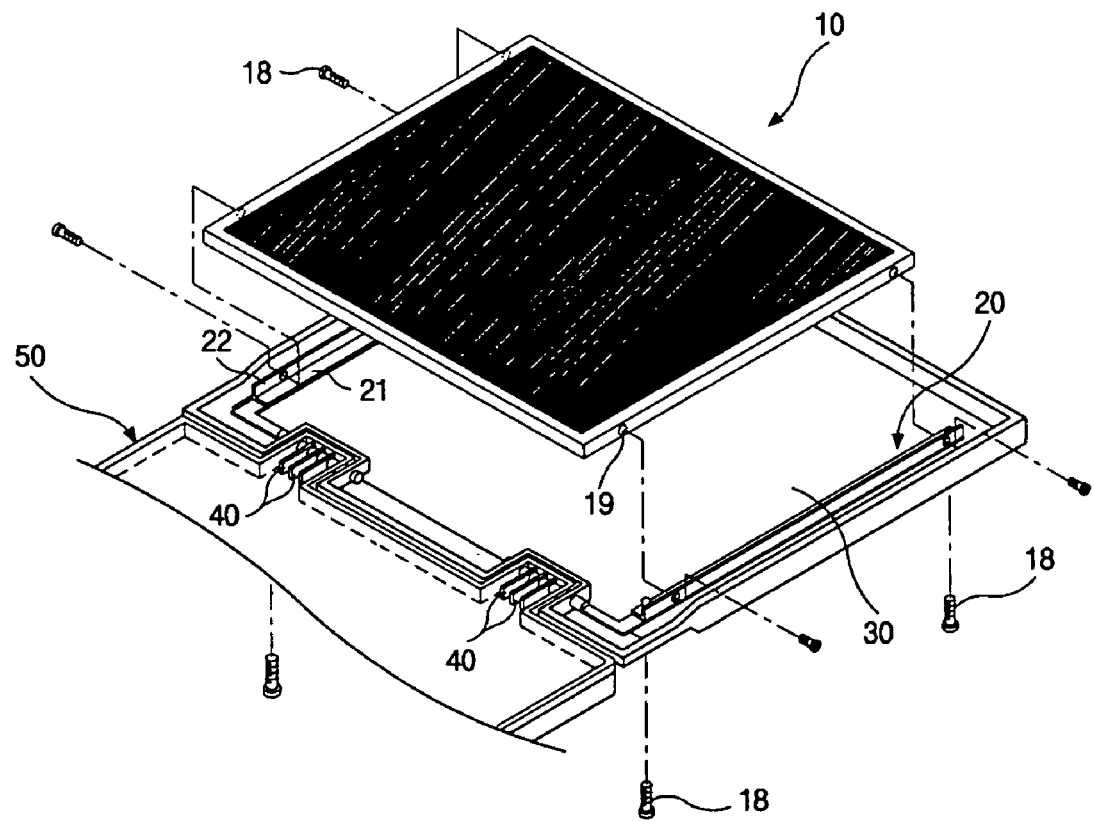
FIG. 12 is a partially exploded perspective view illustrating a structure for mounting a liquid crystal display module of a portable computer according to a second embodiment of the present invention.

FIG. 12 shows an exemplary mounting structure wherein the rear or hinge frame is assembled to the inner, or bottom interior, surface of the case or housing 30 and the display module 10 is mounted inside of the case 30. Preferably, the hinge frame 20 has an "L" shape and has a first surface 21 contacting with the rear surface of display module 10 and a second surface 22 contacting with the side wall surface of the display module 10. The display case 30 has a plurality of screw holes (not shown) on the inner surface thereof, and the first surface 21 of the rear or hinge frame 20 has a plurality of screw holes 25 corresponding to the screw holes of the display case 30. Further, the second surface 22 of the rear or hinge frame 20 preferably has a plurality of screw holes 26 corresponding to the screw holes 19 of the side wall surface of the display module 10. Thus, the first surface 21 of the rear or hinge frame 20 is coupled with the display case 30, and the second surface 22 of the rear or hinge frame 20 is coupled with the display module 10.

Figure 13:
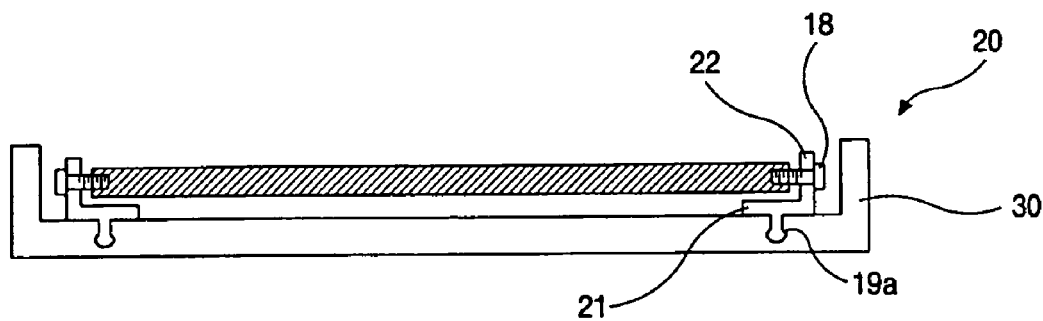
FIG. 13 is a partially exploded perspective view illustrating another structure for mounting a liquid crystal display module of a portable computer according to a second embodiment of the present invention.

FIG. 13 shows another exemplary mounting structure of the second embodiment. The structure of FIG. 13 also shows a mounting structure wherein the hinge frame 20 is assembled to the inner surface of the case 30.

The first surface 21 of the rear frame 20 has a plurality of plastic hooks or fasteners protruded toward the inner surface of the case 30, and the display case 30 has a plurality of fastener fixing holes 19a corresponding to the fastener, thereby the first surface 21 of the rear frame 20 is coupled with the display case 30 by pressing the first surface 21 without tightening a screw.

In the second embodiment, instead of a screw and fastener, a nail can be employed. Further, the hinge frame may be "C" shaped, and a bracket having a long length may be used instead of the hinge frame integrally formed with the pin portion. The hinge frame may have a short length.

As described until here, using the mounting structure according to the invention, the display area is maximized, and a more shock-proof display assembly is provided. Further, the mounting structure according to one embodiment of the invention has an advantage that the display assembly can be assembled to the case without tightening a screw into the side wall surface of the display module. The invention also shows that the hinge frame of the invention can be assembled to a rear surface of the display module or to an inner surface of the case.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A flat panel display device mounted to a case, the case including an inner surface, the flat panel display device comprising: a display module including a fiat display panel, a backlight, a first frame, a second frame, wherein the flat display panel is between the first frame and the second frame, a third frame including, a first fastening part at a rear surface where the first fastening part is within a lateral boundary of the display module, the third frame being fixed to the inner surface of the case with the first fastening part; and a second fastening part at a side surface of the third frame, wherein the third frame is positioned substantially adjacent to the first frame and the third frame being directly fixed to a side part of the display module with the second fastening part such that the second fastening part passes through the third frame and directly protrudes into one of the first and second frames, wherein the third frame comprises a bracket positioned between the inner surface of the case and the display module, and wherein the third frame has at least two brackets positioned at a peripheral portion of the display module, and wherein respective ones of the at least two brackets protrude from a top edge and a bottom edge of the third frame.

2. The flat panel display device of claim 1, further comprising a light guide, wherein the first frame is adjacent to the light guide.

3. The flat panel display device of claim 1, further comprising a reflector plate, wherein the first frame is adjacent to the reflector plate.

4. The flat panel display device of claim 1, wherein the first fastening part comprises:
   a first fastening hole; and
   a screw, wherein the screw enters the first fastening hole and the rear surface of the third frame.

5. The flat panel display device of claim 1, wherein the second fastening part comprises:
   a second fastening hole; and
   a screw, wherein the screw enters the second fastening hole and the side surface of the third frame.

6. The flat panel display device of claim 1, wherein the third frame is coupled to a hinge.

7. The flat panel display device of claim 1, wherein the third frame covers at least an edge of display module.

8. The flat panel display device of claim 1, wherein the third frame has a shape of an "H".

9. A flat panel display device comprising: a case having an inner surface and a plurality of side walls; a display module including a fiat display panel, a backlight, a front frame, a rear frame having a rear surface, a plurality of side surfaces, the rear surface including a first fastening hole, wherein the first fastening hole is located within the lateral edges, a side surface including a second fastening hole; a first fastener directly coupling the rear frame to the inner surface of the case using the first fastening hole; and a second fastener coupling the rear frame to a side wall of the display module using the second fastening hole, wherein the fiat display panel and the backlight are disposed between the front and rear frames, wherein the rear frame comprises a bracket positioned between the inner surface of the case and the display module, and wherein the rear frame has at least two brackets positioned at a peripheral portion of the display module, and wherein respective ones of the at least two brackets protrude from a top edge and a bottom edge of the rear frame.

10. The flat panel display device of claim 9, wherein the first fastening hole associated with the rear surface of the rear frame is located adjacent to the lateral edge.

11. The flat panel display device of claim 9, wherein the flat display panel is a liquid crystal display (LCD).

12. The flat panel display device of claim 9, wherein the first fastener is a screw.

13. The flat panel display device of claim 12, wherein the first fastening hole associated with the rear surface of the rear frame includes a screw hole.

14. The flat panel display device of claim 9, wherein the second fastener is a screw.

15. The flat panel display device of claim 14, wherein the second fastening hole associated with the side surface of the rear frame includes a screw hole.

16. The flat panel display device of claim 9, wherein the first fastening hole and the first fastener define a first fastening part.

17. The flat panel display device of claim 9, wherein the second fastening hole and the second fastener define a second fastening part.

18. A flat panel display device comprising: a case having an inner surface and a plurality of side walls, the inner surface having a first fastening hole; a display module including a fiat display panel, a backlight, a front frame, a rear frame having a rear surface, a plurality of side surfaces, and lateral edges, the lateral edges being formed where the side surfaces join the rear surface, a side surface including a second fastening hole; a first fastener coupling the rear frame to the inner surface using the first fastening hole; and a second fastener directly coupling the rear frame to a side wall of the display module using the second fastening hole, wherein the flat display panel and the backlight are disposed between the front and rear frames, wherein the rear frame comprises a bracket positioned between the inner surface of the case and the display module, and wherein the rear frame has at least two brackets positioned at a peripheral portion of the display module, and wherein respective ones of the at least two brackets protrude from a top edge and a bottom edge of the rear frame.

19. The flat panel display device of claim 18, wherein the rear frame is coupled directly to the case using the first fastening hole.

20. The flat panel display device of claim 18, wherein the first fastening hole associated with inner surface of the case is located adjacent to the lateral edge.

21. The flat panel display device of claim 18, wherein the flat display panel is a liquid crystal display (LCD).

22. The flat panel display device of claim 18, wherein the first fastener is a screw.

23. The flat panel display device of claim 22, wherein the first fastening hole includes a screw hole.

24. The flat panel display device of claim 18, wherein the second fastener is a screw.

25. The flat panel display device of claim 24, wherein the second fastening hole associated with the side surface of the rear frame includes a screw hole.

26. The flat panel display device of claim 18, wherein the first fastening hole and the first fastener define a first fastening part.

27. The flat panel display device of claim 18, wherein the second fastening hole and the second fastener define a second fastening part.

28. A flat panel display device mounted to a case including an inner surface, the flat panel display device comprising: a display module including a flat display panel, a backlight, a first frame, a second frame, wherein the flat display panel is between the first frame and the second frame; and a third frame including a first fastening part at a rear surface where the first fastening part is within a lateral boundary of the third frame, the third frame being fixed to the inner surface of the case with the first fastening part at the rear surface of the third frame, a second fastening part at a side surface, wherein the third frame is positioned substantially adjacent to the first frame and the third frame being directly fixed to a side part of the display module with the second fastening part such that the second fastening part passes through the third frame and directly protrudes into one of the first and second frames, wherein the third frame comprises a bracket positioned between the inner surface of the case and the display module, and wherein the third frame has at least two brackets positioned at a peripheral portion of the display module, and wherein respective ones of the at least two brackets protrude from a top edge and a bottom edge of the third frame.

29. The flat panel display device of claim 28, further comprising a light guide, wherein the first frame is adjacent to the light guide.

30. The flat panel display device of claim 28, further comprising a reflector plate, wherein the first frame is adjacent to the reflector plate.

31. The flat panel display device of claim 28, wherein the first fastening part comprises:
   a first fastening hole; and
   a screw, wherein the screw enters the first fastening hole and the rear surface of the third frame.

32. The flat panel display device of claim 28, wherein the second fastening part comprises:
   a second fastening hole; and
   a screw, wherein the screw enters the second fastening hole and the side surface of the third frame.

33. The flat panel display device of claim 28, wherein the third frame is coupled to a hinge.

34. The flat panel display device of claim 28, wherein the third frame covers at least an edge of the display module.

35. The flat panel display device of claim 28, wherein the third frame has a shape of an "H".

* * * * *